April 1, 1952

F. K. SINGISER 2,591,308

LIGHT VALVE SYSTEM

Filed Oct. 20, 1950

INVENTOR
FRANK K. SINGISER
BY Emery, Booth, Townsend, Miller & Weidner ATT'YS.

Patented Apr. 1, 1952

2,591,308

UNITED STATES PATENT OFFICE 2,591,308

LIGHT VALVE SYSTEM

Frank K. Singiser, Sudbury, Vt.

Application October 20, 1950, Serial No. 191,257

2 Claims. (Cl. 313—91)

Figure 1:
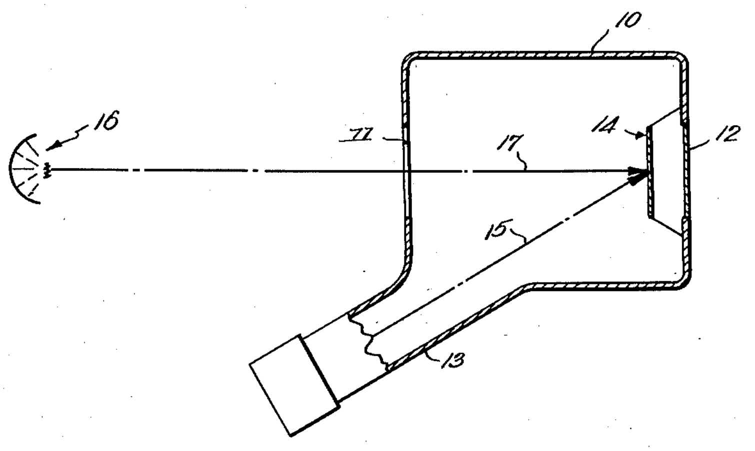

The present invention relates generally to transducers such as form components of television systems, and more particularly to intelligence reproducing or subject imaging devices of the type employing a variable intensity light source independent of the subject illumination and an electro-optical light transmitting or reflecting screen for picture reproduction.

The method and apparatus forming the subject of the invention, while applicable to reproducers generally, including both transmitting and receiving types, is employed to particular advantage in television receivers. Accordingly it will be disclosed and described herein as a means for visibly reproducing intelligence electrically detected. More specifically, it comprises a system employing a novel light transmitting or reflecting member optically projecting an image representative of signals impressed on an electron stream.

In accordance with the invention the unique image-element defining member, herein termed a light valve screen, is mounted for conjoint illumination by a controlled light source and a scanning electron beam, and to transmit or reflect light values varying from point to point conformant to the beam modulation by the impressed signals which may be representative of high light, middle tone and shadow areas of a subject to be reproduced.

The various methods and apparatus employed heretofore for television transmission have involved structural characteristics and principles of operation giving rise to manufacturing difficulties and component transfer characteristics greatly increasing the cost and adversely affecting the quality of the reproduction produced thereby. Particularly objectionable are those receiver characteristics which limit or reduce picture size and brightness, and which yield losses in detail or resolution, and also geometric and other distortions in the projected image. Unduly wide frequency bands have been required, and projection of a televised image of desired size and for comfortable viewing under normal or daylight conditions has not generally been attained.

These and other difficulties and limitations are avoided and overcome by the means and methods of the present invention, in particular by the substitution in accordance therewith for the secondary emitter and luminescent screen of conventional receivers a novel electro-optical image defining medium which effects a reproduction characterized by a high standard of graininess, sharpness and tone scale not heretofore obtainable, and which may be projected over varying areas and adjusted for desired intensity or illumination.

Such unique light transmitting or reflecting medium further embodies a light interrupting and reticulating grid or screen which in a sense avails of the operative principle of the so-called half-tone screen known to the art of photoengraving, in that it translates light values of a variable intensity, fixed area original or subject into a unique, discontinuous mosaic or dot pattern image of constant intensity but variable area. The grid or screen further provides for the mosaic and independently of the transmitted signal a tonal gradient defining reference medium or datum level, from which the subject values are built up or down element by element in the projected image.

Figure 2:
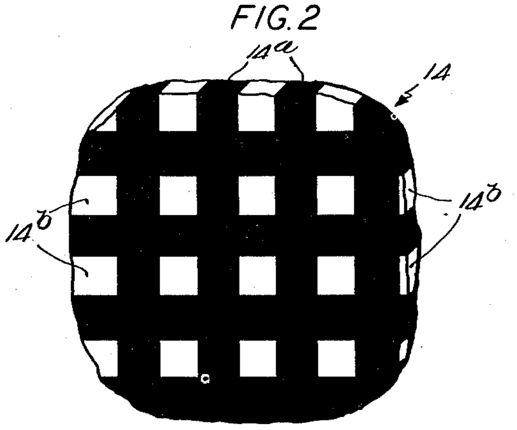

The invention will be more fully understood by reference to the following description, taken in conjunction with the accompanying drawings, in which:

Fig. 1 is a schematic view of a television receiving apparatus incorporating my novel light valve screen, and Fig. 2 is a fragmentary diagrammatic view on an enlarged scale of the valve screen proper.

Referring now to Fig. 1 there is shown a cathode ray tube 10 comprising an evacuated glass envelope mounting at one end thereof a transparent window 11 and opposite thereto a ground glass or luminescent projection screen 12, which defines the area over which the mosaic projection or image effected by my light valve system will be disposed at any instant. Tube 10 is also provided with an elongated neck 13 which is positioned out of the plane of window 11 and screen 12 and in which the electron gun, including focussing, accelerating, deflecting, and modulating electrodes, is arranged in the conventional manner and therefore not shown.

My novel light valve screen 14 is mounted adjacent projection screen 12 and in the path of the electron beam, shown in broken line at 15. Variable intensity visible light from a controlled light source or projection lamp 16 is directed through window 11 at valve screen 14 along a path indicated by dot and dash line 17. The light valve screen 14 is shown more or less diagrammatically and on an enlarged scale in Fig. 2, from which it will be apparent that the same avails of certain features similar in principle to the so-called half-tone screen as hereinbefore mentioned. A main object of the present invention is the adaptation of certain of the half-tone principles to electro-optical intelligence reproduction or subject imaging, as for example in television receivers, as will presently appear.

The behaviour of the half-tone screen is according to well known laws of light, and the image or mosaic produced thereby is unique and instantly recognizable. As is generally understood, the half-tone negative is a record of uneven character and even density, as contrasted with the ordinary or continuous tone negative which is of even character but uneven density. In other words, reproduction by the half-tone process translates detail and gradation of the subject into dots which vary in size but are of theoretically uniform density, the effect of a continuous gradation being obtained as a result of an optical illusion by which the individual spots swim together or blend and become indistinct at normal viewing distances for a particular screen ruling. More particularly, the various elemental areas of the subject are translated into a mosaic comprising black spots representing highlight areas, a lattice or grid representing middle or half-tone areas, and white dots representing shadow areas in the original, the spots and dots varying inversely and by infinitesimal degree to reproduce exactly all values in between.

The half-tone screen as used in photoengraving may be said generally to comprise a regular geometric array of intersecting light-interrupting walls or bands, the thickness of the bands and the area of their intersection being exactly equal to that of the light transmitting screen apertures formed thereby. This characteristic grid structure results from the theoretical requirement that the ratio 3:1 opacity to transparency must obtain at any face of the screen, and must be continued in depth from one face to the other. The result is a multicellular array composed of transparent chambers having opaque, commonly parallel walls constituted in effect by bodies of uniform height, thickness, and depth. Thus for every transparent area or section of the screen there are three adjoining opaque sections identical thereto in size and shape.

For the most faithful reproduction of an original subject or copy by the half-tone process it has been found desirable to have the screen bands intersect at right angles and to require that the screen apertures be square. It is generally considered also that the screen is most advantageously mounted to have the bands angularly displaced from the lines of the original, particularly where the subject has a geometrical texture, both to eliminate moire and to prevent the eye from resolving middle-tone areas into the lattice or grating pattern. The size of the screen apertures, or the fineness of the screen ruling is influenced by numerous considerations such as the quality of the paper used or the detail required for a reproduction, and varies over a wide range. It will be understood that for any given subject and any desired reproduction thereof, there is a desired or proper combination of exposure, camera extension, diaphragm aperture, screen aperture, screen or focal distance, and threshold value of the emulsion. It is noted further that for any given screen ruling there is an area or plane of projection in which the so-called half-tone mosaic or image will appear, spaced from the screen by a more or less exact distance, termed generally the screen or focal distance, which may be determined experimentally.

Assuming proper values for the factors mentioned, the half-tone mosaic will appear as follows. In the projection screen areas opposite to and representative of high-light areas of the original, directly opposite the intersection of the bands or walls separating any four adjoining half-tone screen apertures or chambers will appear a blank or unilluminated spot. The size and location of the spot is generally considered to result from diffraction of light of maximum intensity over an area in the focal plane nearly nine times as great as that of the screen aperture, and into a pattern approximating a circle but with flattened segments corresponding in position to the chamber walls. Maximum intensity is defined as light composed of a minimum value received from the entire subject to which is added a plus value received from the highlight area of the original opposite the screen aperture. The unilluminated spots are thus positioned at the intersection of the peripheries of the light circles produced by the four screen apertures mentioned. In the shadow areas, or areas of minimum light intensity, it can be shown that the projected mosaic is characterized by a white or illuminated dot directly opposite the center of the screen aperture and equal in size to the black spot previously referred to. And in middle-tone areas, or more precisely areas of about $^4/_9$ maximum light intensity, it follows that the circle of illumination will be approximately $\frac{4}{9}$ that of the highlight area, or equal in size to the screen aperture. The mosaic pattern in these half-tone areas will therefore be an exact reproduction of the screen itself, being a reticulated or latticed pattern or grid, in which any nine-square area opposite to and projected by a screen section having apertures at its four corners will be represented by four white and five black squares, the latter being arranged as a cross. This will be seen to result from a decrease in size of the highlight dot and a simultaneous increase in the size of the shadow spot to cover an area equal and opposite respectively to the associated screen aperture and band intersection. It will be appreciated that nine square image portions can be found in these $\frac{4}{9}$ maximum highlight or middle-tone areas which are centered about a white dot, and thus have eight black squares, indicating an 8:1 band-aperture square ratio in the corresponding screen portion. Studies of the half-tone mosaic have shown also that when the screen illumination is varied from the mentioned $\frac{4}{9}$ to precisely 50% maximum highlight, the characteristic and readily identified 3/1 spot-dot lattice or grating pattern is destroyed, and the white dots halo or expand to comprise approximately 50% of the image area.

It will be seen from Fig. 2 that my novel light valve screen 14 embodies the cited characteristics of the half-tone screen. More particularly the thickness of the bands 14*a* and the area of their intersections is predeterminedly equal to the width or height and the area of the apertures or chambers 14*b* formed therebetween. It is to be understood also that this relationship is continued in depth, as described, such that the screen chambers 14*b* are bounded on all sides by walls of identical cross section, the bands 14*a* thus having intermediate their intersection aperture-spacing sections equal in height, depth, and thickness to said chambers. Insofar as it may be likened to a half-tone screen, then, light valve screen 14 is constructed in accordance with the mentioned theoretical requirement of 3:1 opacity to transparency.

As contemplated by the invention, however, spaced light valve chambers 14b are not uniformly transparent as required for the half-tone screen, but have a light throttling or valving capacity expressed variously as a light transmitting or reflecting power, which power is modulated conformant to the variations in intensity of illumination of the elemental areas of a televised subject. In other words, chambers 14b may be filled, in effect, with an electro-optical medium which passes or reflects light from lamp 16 in amounts and to a degree determined at any instant by the strength or velocity of scanning beam 15, and the grid defining walls 14a are predeterminedly constituted by a medium uniformly and at all times opaque to light. It will be understod that to perform its function in my novel light valve system the screen 14 need not be material or substantial in nature, but may be constituted by any means, chemical, electrical or mechanical, effecting areas fixedly opaque to visible light alternating with areas which are rendered variably transparent or opaque by the absorption of electrical energy. For the purposes of description of the illustrated embodiment, however, the screen will be considered as having physical form.

In the exemplary embodiment of Fig. 2 the screen bands 14a may be formed of a suitable opaque and electrically insulating material, as glass, rubber, plastic, ceramic and the like. In each screen chamber 14b there is provided an electro-optical medium the opacity or reflecting power of which is at any instant determined by the subject light values represented by the electron beam focussed thereon. Numerous electro-optical or dichroic media have been proposed for such purpose, wherein the electrical impulses variously affect the coefficient of diffusion, the refractive index or the screen element position. The chamber volume may for example be constituted by a deposit of an ionic crystal of the class in which there are electrically positive and negative components held together by forces which are electrostatic in part, and which includes the alkali halides, such as the fluorides, bromides and iodides of sodium and potassium, and certain silver salts, such as silver bromide. In such instance the deposit may be in the form of a single flat crystal, a mosaic of small crystals, or a micro-crystalline structure. The crystal deposit normally transparent to visible light will be rendered opaque to a degree directly proportional to the instantaneous value of the impinging electron beam 15.

With such embodiment it will be convenient to modulate the beam in accordance with but reversely of the received picture signal, such that the intensity or velocity of the beam decreases with increase of signal strength. The disappearance of the opaque deposit can be produced by maintaining the screen in an electric field, the deposit being drawn to a positive pole provided at one face of the screen. The speed of movement of the deposit can be controlled by the strength of the field and the temperature, which may be varied within wide limits as by the provision of suitable electrodes and heaters in known manner. It will be understood that this fugitive deposit may be caused to disappear within a predeterminable period, as for instance the frame scanning period, or for a slightly longer period, as desired, by appropriate variation of the temperature and field strength of the crystal. As noted previously, my valve screen 14 may function variously as a light transmitting and as a light reflecting medium, and the light source and electron gun may be mounted to illuminate and scan variously the same and opposite faces thereof. The electro-optical medium therefore may comprise alternatively a transparent liquid, such as oil, of suitable dielectric constant in which are suspended disc or flake-like colloidal particles of high light absorbing or reflecting power and of suitable dielectric constant, such as graphite or aluminum flakes or discs, or synthetic quinine iodide crystals otherwise identified as herapathites. In the latter instance the screen will require front and back walls of insulating, transparent material, as for example mica, within which the liquid suspension is sealed and which are normally maintained at a potential difference permitting random variation of the particles, but which is modified at elemental areas thereof by the electron beam to effect orientation rendering the screen chambers variously opaque or transparent. It will be appreciated that for light absorbing particles a positive modulation and for light rejecting particles a negative modulation of the electron beam will generally be required.

It will be evident that the electro-optical media mentioned and such other materials as may be adapted for use in my novel light valve screen will have an opacity which for a given intensity of illumination by controlled light source 16 will produce the described mosaic or dot pattern image. In other words, screen chambers instantaneously energized by the minimum intensity value for the electron beam 15 will be represented in the mosaic by a shadow spot positioned centrally of the projection screen area opposite thereto; half or middle tone intensity values will be translated by the screen into the described lattice or grating pattern; and screen chambers modulated by said beam for maximum intensity illumination will effect in the projection areas opposite the intersections of the screen walls isolating the same the characteristic unilluminated highlight dot. As employed herein the term "opacity" will be understood to indicate the equivalent of the term "threshold," used in photo-engraving and related arts, which may be defined by the relation $$\frac{\text{time} \times \text{intensity}}{\text{sensitivity}}$$

Whatever the electro-optical media chosen, the operation of my novel valve screen will be to modulate the beam from constant intensity lamp 16 to project in the focal plane a total image or mosaic projection whose values from highlight to shadow are precise and predictable, and which is comprised of areas of illumination which vary in size but which are of approximately constant intensity and which are equal in number to the picture elements scanned. Light rays from lamp 16 are directed with brightest constant intensity desirable at screen 14 and in passing over the surfaces of cell walls 14a will diffract and be shown on projection screen 12 as illuminated areas contrasted with adjacent areas not illuminated. The area of the mosaic illuminated will be the mosaic element for any corresponding aperture and chamber. That is, each chamber will effect a single corresponding mosaic element making it a larger or smaller area of illumination according to the transparency of the chamber as determined by the instantaneous signal strength of the cathode ray beam focussed thereon.

Projection screen 12 is predeterminedly mounted at the appropriate focal distance from screen 14 and will thus be illuminated by the described unique and instantly recognizable mosaic pattern.

As hereinbefore stated, the total number of screen chambers and mosaic elements will equal the total number of picture elements per frame as scanned by my system. The high standard of graininess, sharpness, and tone scale contemplated for the final image by the present invention has been achieved in the half-tone process with screen rulings varying generally from 65 to 150 screen bands or lines to the linear inch. Accordingly a dissecting standard of 200,000 picture elements per frame and a screen ruling of say 75 lines to the inch will give the valve screen 5,625 apertures to the inch and overall dimensions of about 6.8 in x 5.2 in., or a total surface area of approximately 35.5 sq. in. Further, each screen aperture will have an area of $\frac{1}{150} \times \frac{1}{150} = \frac{1}{22,500}$ sq. in., and the entire 200,000 element apertures will encompass only 8.8 sq. in., or one-fourth of the total screen area, conformant to the hereinbefore mentioned 3:1 opacity to transparency ratio.

As hereinbefore mentioned an important gain resultant from the application of the invention to television systems is the provision of means economically providing an image of high detail resolution and superior tonal gradation while relatively free from distortion and glare. The described light valve screen will be seen to effect in the projected image and independently of the transmitted signal a pattern or datum level from which the subject representative light values are built up or down by the modulation of the electron beam. More particularly, assuming all of the screen chambers 14b to be energized simultaneously at a level representative of middle tone areas in the subject, the valve screen will interrupt the light rays of beam 17 to effect in the plane of screen 12 the described reticulated grid or lattice pattern. Modulation of the transmitted signal in known manner and representative of the above mentioned highlight and shadow areas of the original will vary in proportion the image values from the middle tone level of the lattice to the precise spot and dot pattern most faithfully reproducing the subject. It should be noted also that scanning beam 15 is required to energize only that area embraced by screen apertures 14b, or approximately one-fourth part of the valve screen as already described. It will be apparent, further, that the scanning beam 15 is not required to be focused as accurately as with existing or conventional devices or systems, inasmuch as the picture element size is determined not by the diameter of the beam but by the area of the screen aperture. The significant advantages in design and manufacture flowing from this characteristic will be readily appreciated by those skilled in the art.

The high resolution image effected by my novel light valve system may be viewed on ground glass screen 12 directly or through a magnifying lens, or it may be expanded as desired by a suitable projection system for remote viewing. Illumination of the projected image may readily be varied as required for differing viewing projections and conditions by regulating lamp 16 for desired intensity of light beam 17. It will be understood that while three-fourths of the light from beam 17 is interrupted at valve screen 14, increase in intensity of the beam 17 to such values as may be required for large area mosaic projections is easily accomplished, as by increasing the power rating of lamp 16, having a relatively low and inexpensive power consumption. For example, lamp 16 may be a 1000 watt projection lamp. It should be realized also that the described delay characteristic of the valve screen effects a constant illumination of the projected image throughout the frame period, and frees the same from objectionable flicker. The light valve system is thus adapted to a frame repetition rate no greater than that required by the eye in perceiving continuous movement, and may well be on the order of 17 to 20 frames per second. It will be obvious that this permits a substantial reduction in the frequency band width necessary to the television signal.

It is to be understood that the invention is not limited to television receivers, as described herein by way of example only, but is applicable to transducers or reproducers generally, providing an intelligence translating and image dissecting medium adapted to both transmission and reception of a subject or picture signal.

From the foregoing it will be appreciated that my novel light modulating or valving system provides a television component of superior transfer characteristics, and effects economically an extraordinarily sharp, clear projected image adapted for varying projection and illumination, and characterized by faithful reproduction of light values and near total absence of distortion and glare.

My invention both as to method and means is not limited to the particular embodiments thereof illustrated and described herein, and I set forth its scope in my following claims.

I claim:

1. For subject imaging devices of the type employing an electro-optical light transmitting or reflecting screen for picture reproduction upon conjoint illumination by an independent light source and scanning by a subject-signal-modulated electron beam, a new and improved light valve screen comprising a light impeding grid defined by a regular geometric array of uniform, aligned, opaque, electrically insulating, screen bands intersecting at right angles and uniformly spaced by a band width, and a picture element number of electro-optical screen chambers formed between said bands, said screen chambers defining image elements representative of the light values of the corresponding subject elements and constituting in the aggregate a high resolution mosaic of uneven character and uniform density, the construction and arrangement of said bands being such as to surround each screen chamber volume with eight identically proportioned chamber isolating screen band volumes, whereby the relation 3:1 opacity to transparency is maintained in said screen.

2. In apparatus for visibly reproducing intelligence electronically detected, the combination of a projection screen; means directing a constant intensity light column at said screen; means for developing a signal-modulated scanning electron beam to intersect said column; and a light valve screen mounted at said intersection and at a focal distance from said projection screen; said light valve screen comprising a regular geometric array of right angular intersecting, electrically insulating, optically opaque bands, and a picture element number of electro-optical chambers formed between said bands, the bands proportioned and arranged to surround each light valving chamber with eight identically dimensioned opaque areas whereby to present at any face of said screen a grid three-fourths of the area of which is embraced by said bands, said chambers providing a volume absorbing the rays of said column conformant to the energization thereof by said scanning beam, whereby the light valve screen projects over said first named screen a discontinuous mosaic representative of said intelligence.

FRANK K. SINGISER.

REFERENCES CITED

The following references are of record in the file of this patent:

UNITED STATES PATENTS

| Number | Name | Date |
|---|---|---|
| Re. 22,115 | Herbst | June 16, 1942 |
| 2,025,143 | Zworykin | Dec. 24, 1935 |
| 2,163,918 | Schwartz | June 27, 1939 |
| 2,281,280 | Gabor | Apr. 28, 1942 |
| 2,302,124 | Hergenrother | Nov. 17, 1942 |
| 2,315,113 | Farnsworth | Mar. 30, 1943 |
| 2,432,908 | Leverenz | Dec. 16, 1947 |
| 2,495,697 | Chilowsky | Jan. 31, 1950 |